United States Patent
Stone et al.

(10) Patent No.: US 7,987,504 B2
(45) Date of Patent: Jul. 26, 2011

(54) SYSTEM AND METHOD FOR ROUTING SIGNALS INTENDED FOR ONE DEVICE THROUGH ANOTHER DEVICE CONNECTED TO A SHARED ACCESS NETWORK

(75) Inventors: Christopher J. Stone, Newtown, PA (US); Leonard G. Filomeo, San Diego, CA (US); Richard S. Grzeczkowski, Perkasie, PA (US); Andrea C. Harriman, Yardely, PA (US)

(73) Assignee: General Instrument Corporation, Horsham, PA (US)

( * ) Notice: Subject to any disclaimer, the term of this patent is extended or adjusted under 35 U.S.C. 154(b) by 992 days.

(21) Appl. No.: 11/315,858

(22) Filed: Dec. 22, 2005

(65) Prior Publication Data

US 2006/0294250 A1      Dec. 28, 2006

Related U.S. Application Data

(60) Provisional application No. 60/690,214, filed on Jun. 14, 2005.

(51) Int. Cl.
*G06F 9/00* (2006.01)
(52) U.S. Cl. .................. 726/12; 726/2; 726/26; 726/27
(58) Field of Classification Search .................. 726/12, 726/2, 26, 27
See application file for complete search history.

(56) References Cited

U.S. PATENT DOCUMENTS

| | | | |
|---|---|---|---|
| 2002/0021465 A1* | 2/2002 | Moore et al. | 359/125 |
| 2002/0101991 A1* | 8/2002 | Bacon et al. | 380/212 |
| 2003/0066075 A1* | 4/2003 | Bahn et al. | 725/25 |
| 2004/0088537 A1* | 5/2004 | Swander et al. | 713/153 |

* cited by examiner

Primary Examiner — Jason K Gee
(74) Attorney, Agent, or Firm — Stewart M. Wiener

(57) ABSTRACT

A system (100) and method (200) for delivering conditional access information to a conditional access controlled device (120) incompatible with the conditional access transmission protocol. The conditional access information is delivered through a conditional access controlled device (110) compatible with the conditional access transmission protocol via a home network connection (130) between the conditional access controlled devices and according to a home network transmission protocol with which both conditional access controlled devices are compatible. The device (110) compatible with the conditional access transmission protocol receives the conditional access information on behalf of the device (120) incompatible with the conditional access transmission protocol, reformats the received conditional access information according to the home network transmission protocol, and transmits the reformatted information to the device (120) incompatible with the conditional access transmission protocol according to the home network transmission protocol and via the home network connection (130).

14 Claims, 3 Drawing Sheets

SYSTEM AND METHOD FOR ROUTING SIGNALS INTENDED FOR ONE DEVICE THROUGH ANOTHER DEVICE CONNECTED TO A SHARED ACCESS NETWORK

CROSS-REFERENCE TO RELATED APPLICATION

This application claims priority to the filing date of a U.S. provisional patent application having Ser. No. 60/690,214, entitled "SYSTEM AND METHOD FOR ROUTING SIGNALS INTENDED FOR ONE DEVICE THROUGH ANOTHER DEVICE CONNECTED TO A SHARED ACCESS NETWORK", filed on Jun. 14, 2005, which is incorporated herein by reference in its entirety.

BACKGROUND OF THE INVENTION

1. Field of the Invention

The invention relates to conditional access controlled devices connected to shared conditional access networks. More particularly, the invention relates to delivering conditional access information to conditional access controlled devices that support different transmission protocols.

2. Description of the Related Art

In many home or business networks that are connected to shared conditional access networks (e.g., cable television service providers and satellite television service providers), a conditional access controlled device, such as a signal converter or decoder (set-top) box, is used to receive signals from a source, such as a cable television plant. The set-top box (STB) or other suitable conditional access controlled device receives conditional access information, audio/video services and other information from the source according to a transmission protocol with which the conditional access controlled device is compatible or by which the conditional access controlled device is supported. The conditional access controlled device interprets or decodes the information and uses the information to manage conditional access features and other command, control and configuration features applicable to the conditional access controlled device.

Some home networks include different conditional access controlled devices that often are compatible with only one or a few particular transmission protocols or with different transmission protocols than other conditional access controlled devices. Also, certain information transmitted by the source to the destination is transmitted in only one particular transmission protocol, where the transmission protocol is not always compatible with every conditional access controlled device in the end location, e.g., the home or business network.

For example, traditionally, many home networks typically included a conditional access controlled device, i.e., a set-top box, that supported a legacy communication protocol that allows the device to communicate directly with the conditional access system. However, innovation and market forces have created a new generation of communication protocols that are not supported by legacy devices. The new communication protocols were then rolled into the conditional access system, thus making some legacy devices obsolete. Cost reductions on newer products also reduce the inclusion of the new communication protocols on the conditional access controlled devices. Many of these different conditional access controlled devices have different hardware configurations and/or use different transmission protocols that often are not supported by or compatible with the conditional access control system.

Similarly, most cable television service providers transmit much of their information according to one or more transmission protocols with which most set-top box devices are relatively compatible. However, some information transmitted by the service provider, e.g., conditional access (CA) messages, often requires specific hardware to support the protocol used to transmit such information. Many existing conditional access controlled devices in the home network do not include such hardware or otherwise do not support the particular transmission protocols used to transmit such information.

To replace existing conditional access controlled devices with conditional access controlled devices that include the hardware necessary to support most conditional access transmission protocols would be relatively time consuming and expensive for the service provider and/or the end user. Similarly, to upgrade existing conditional access controlled devices to make their hardware configuration compatible with most conditional access transmission protocols cannot be done without relatively significant time and expense. Moreover, conditional access transmission protocols sometimes change slightly over time as improved versions are made available, or such protocols sometimes are completely replaced with new or different protocols. Thus, it would be relatively impractical to replace conditional access controlled devices or upgrade their hardware configurations as rapidly as conditional access transmission protocol revisions become available.

DETAILED DESCRIPTION

Figure 1:
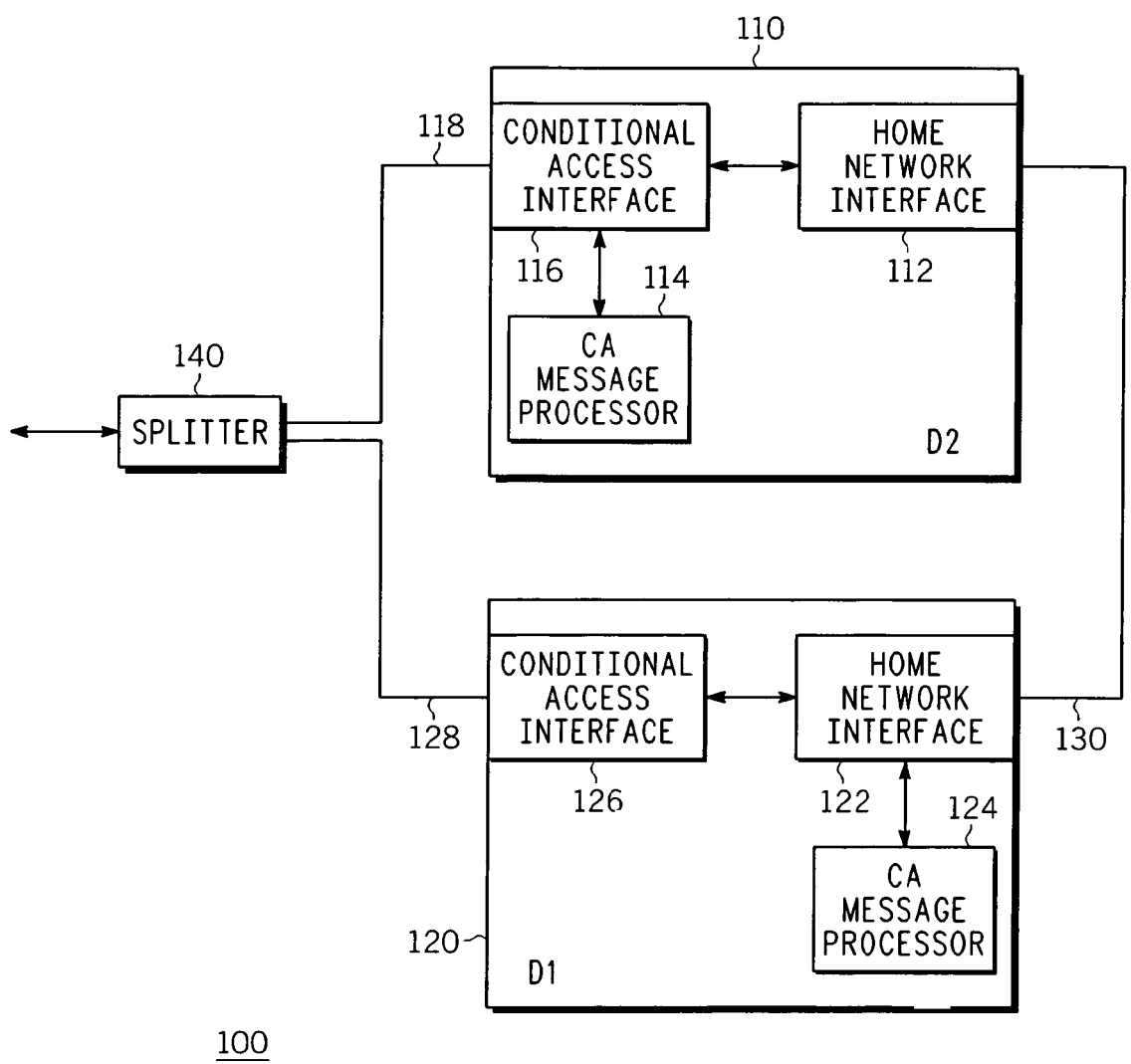
FIG. 1 is a block diagram of a home or business network that includes a system for routing conditional access information intended for one conditional access controlled device through another conditional access controlled device.

In the following description, like reference numerals indicate like components to enhance the understanding of the signal routing method and system through the description of the drawings. Also, although specific features, configurations and arrangements are discussed hereinbelow, it should be understood that such specificity is for illustrative purposes only. A person skilled in the relevant art will recognize that other steps, configurations and arrangements are useful without departing from the spirit and scope of the invention.

Referring now to FIG. 1, shown is a block diagram of a home or business network system 100 for routing conditional access information intended for one conditional access controlled device through another conditional access controlled device. The system 100 is any suitable home or business network, e.g., a home or business network connected to a shared conditional access network. The system 100 includes at least two conditional access controlled devices, e.g., a first conditional access controlled device 120 (D1) and a second conditional access controlled device 110 (D2) coupled together via a home network connection 130.

For purposes of discussion herein, the conditional access controlled devices 110 and 120, along with the home network connection 130, constitute a home or business network, although other conditional access controlled devices could be included in the home or business network as well. Both the first conditional access controlled device 120 and the second conditional access controlled device 110 gain access to a shared conditional access network (not shown) via a signal splitter 140 or other suitable component or method for operably connecting the conditional access controlled devices and the home network to a shared conditional access network.

The first conditional access controlled device 120 includes a home network interface 122 for connecting the first conditional access controlled device 120 to the home network via the home network connection 130. Similarly, the first conditional access controlled device 120 includes a conditional access interface 126 for connecting the first conditional access controlled device 120 to the shared conditional access network via a conditional access connection 128 and the signal splitter 140. The first conditional access controlled device 120 also includes a conditional access (CA) message processor 124 for reading CA messages transmitted to the first conditional access controlled device 120.

In the system 100 as shown, and as will be discussed in greater detail hereinbelow, the first conditional access controlled device 120 is configured in such a way that the first conditional access controlled device 120 is not supported by or compatible with the particular conditional access transmission protocol(s) used to transmit conditional access information to the system 100. Thus, the conditional access interface 126 in the first conditional access controlled device 120 does not support the conditional access transmission protocol(s) used to transmit conditional access information to the system 100.

The second conditional access controlled device 110 includes a home network interface 112 for connecting the second conditional access controlled device 110 to the home network via the home network connection 130. The second conditional access controlled device 110 also includes a conditional access interface 116 for connecting the second conditional access controlled device 110 to the shared conditional access network, via a conditional access connection 118 and the signal splitter 140.

In the system 100, and as will be discussed in greater detail hereinbelow, the second conditional access controlled device 110 is configured to be supported by and compatible with at least one conditional access transmission protocol used to transmit conditional access information to the system 100. The second conditional access controlled device 110 also includes a conditional access (CA) message processor 114 for reading CA messages transmitted to the second conditional access controlled device 110. Although the CA message processor 114 is shown connected to the conditional access interface 116, it also can be connected to the home network interface 112, or to both interfaces at the same time.

Each of the first and second conditional access controlled devices 110, 120 can be any suitable signal processing device, such as a signal converter or decoder (set-top) box, a residential gateway, or a cable modem. Other suitable devices include a computer, a video receiver and a digital video disk recorder with set-top box and/or cable modem capabilities. Also, one or more of the conditional access controlled devices in the system 100 can be comprised of any suitable structure or arrangement, e.g., one or more integrated circuits.

Each one of the conditional access controlled devices can be completely or partially configured in the form of hardware circuitry and/or other hardware components within a larger device or group of components. Alternatively, each of the conditional access controlled devices can be completely or partially configured in the form of software, e.g., as processing instructions or one or more sets of logic or computer code. In such configuration, the logic or processing instructions typically are stored in a data storage device (not shown), which typically is coupled to a processor or controller (not shown). Both the data storage device and the processor or controller can be included as part of the conditional access controlled device, although such is not necessary. The processor accesses the necessary instructions from the data storage device and executes the instructions or transfers the instructions to the appropriate location within the conditional access controlled device.

The home network connection 130 can be any suitable home network connection. Such connections include, e.g., a token ring, Ethernet, Fast Ethernet, Gigabit Ethernet, any networking connection technology in accordance with the standards established by the Home Phoneline Networking Alliance (HomePNA) or the Multimedia over Coax Alliance (MoCA), powerline networking, and any networking connection technology in accordance with the IEEE 802.11 standard established by the Institute of Electrical and Electronics Engineers. Similarly, the conditional access connections 118 and 128 can be any suitable shared conditional access network connection, including any one or more of the previously mentioned home network connections.

The home network connection 130 and/or the conditional access network connections 118, 128 also can be a wired network using Ethernet cables, coaxial cables, fiber optic cables, or a wireless network or any combination thereof. Also, the home network connection 130 can support any number of suitable transmission protocols, including Transmission Control Protocol/Internet Protocol (TCP/IP).

The CA message processors 114, 124 determine which of the messages received from the shared conditional access network is suitable for use in the respective conditional access controlled devices 110, 120. For example, only a customer who has paid for premium television services, such as movie channels, may gain access to those channels via the appropriate conditional access controlled device. The CA message processor in each conditional access controlled device makes such determinations based on how each conditional access controlled device is configured.

Different conditional access transmission protocols set different requirements on the signaling between a first type of device (e.g., a set-top box) and the shared conditional access network, and a second type of device (e.g., a cable modem) and the shared conditional access network. These conditional access transmission protocols allow devices of varying manufacturers to deliver and/or receive conditional access information in a specific format and at specific times. Such transmission protocols include those protocols established by the Society of Cable Telecommunications Engineers (SCTE), e.g., SCTE-55, more specifically SCTE 55-1 and SCTE 55-2, which use quadrature phase shift keying (QPSK) out of band (OOB) signaling. Other conditional access transmission protocols include Data Over Cable Service Interface Specification (DOCSIS) and DOCSIS set-top gateway (DSG).

As discussed hereinabove, for purposes of discussion herein, the conditional access interface 116 in the second conditional access controlled device 110 is compatible with the particular conditional access transmission protocols used in the system 100. However, the conditional access interface 126 in the first conditional access controlled device 120 is not compatible with the particular conditional access transmission protocols used in the system 100. For example, if the shared conditional access network is operating using the SCTE-55 and DOCSIS protocols, but the first conditional access controlled device 120 is compatible only with SCTE-55, the first conditional access controlled device 120 will not be able to directly receive conditional access information from the shared conditional access network that is transmitted using the DOCSIS protocol. Similarly, the first conditional access controlled device 120 will not be able to transmit conditional access information to the shared conditional access network using the DOCSIS protocol.

As another example, consider a system that includes a second conditional access controlled device 110 that supports both QPSK OOB and DSG protocols and a first conditional access controlled device 120 that only supports the QPSK OOB protocol. If the shared conditional access network is delivering CA messages only via DSG, the first conditional access controlled device 120 will not be able to directly receive the CA messages.

The system 100 overcomes such problems by having the second conditional access controlled device 110 (or any other suitable conditional access controlled device that is compatible with the existing conditional access transmission protocol or protocols) receive conditional access information and messages, including CA messages, on behalf of the first conditional access controlled device 110 (or any other suitable conditional access controlled device that is not compatible with the existing conditional access transmission protocol or protocols). The second conditional access controlled device 110 receives the conditional access information intended for the first conditional access controlled device 120 and repackages or reformats the conditional access information according to a transmission protocol that is compatible with the first conditional access controlled device 120 and/or other home network devices. For example, the second conditional access controlled device 110 divides the conditional access information into smaller packets and transports the packets as payload data in a different packet with a different header structure that is compatible with the local network and with the first conditional access controlled device 120.

Once the second conditional access controlled device 110 properly reformats the conditional access information, the second conditional access controlled device 110 transmits the reformatted conditional access information to the first conditional access controlled device 120 via the home network connection 130. When the first conditional access controlled device 120 receives the reformatted conditional access information, the first conditional access controlled device 120 removes the reformatting or repackaging overhead that was needed to transmit the conditional access information from the second conditional access controlled device 110 to the first conditional access controlled device 120 over the home network connection 130. The first conditional access controlled device 120 then can use the conditional access information. If the conditional access information includes CA messages, the first conditional access controlled device 120 processes the conditional access information by its CA processor 124.

Therefore, in this manner, a multiple services operator (MSO) or other information or data service provider can effectively upgrade their system to a new hardware protocol or transmission protocol without rendering existing incompatible conditional access controlled devices obsolete, as long as at least one of the conditional access controlled devices in the home network supports or is compatible with the new transmission protocol(s) used to provide conditional access information to the home network, and the remaining network devices in the home network have the ability to connect to the supporting device. That is, the conditional access controlled devices within the home network support at least one common protocol that allows the devices to communicate with each other within the home network.

Figure 2:
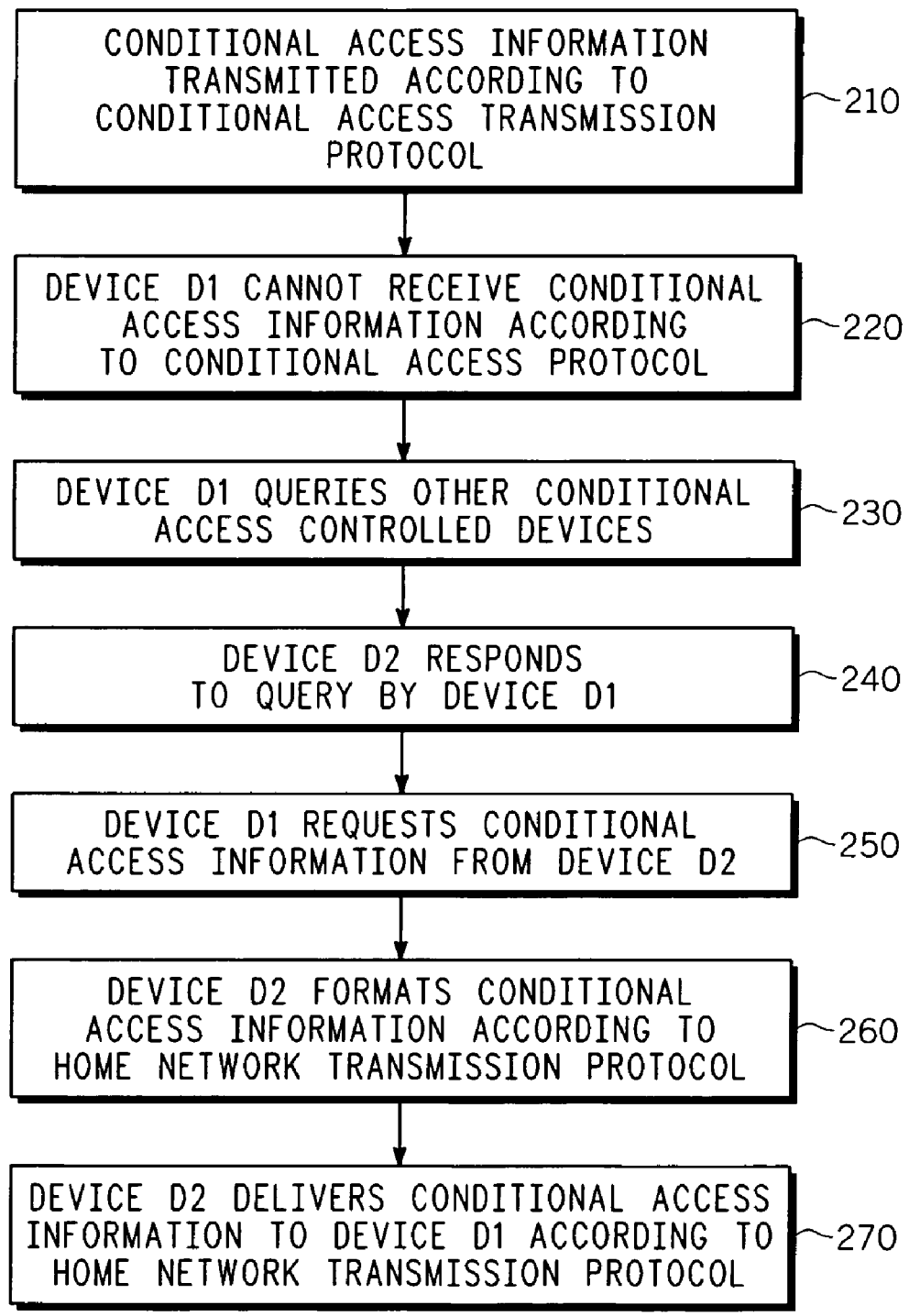
FIG. 2 is a flow chart of a method for routing conditional access information intended for one conditional access controlled device through another conditional access controlled device.

Referring now to FIG. 2, shown is a block diagram of a method 200 for routing conditional access information intended for one conditional access controlled device through another conditional access controlled device. The method 200 includes a step 210 of transmitting conditional access information and messages from a shared conditional access network to a home network according to a conditional access transmission protocol. The conditional access information is transmitted from a headend or other suitable location in the shared conditional access network to one or more conditional access controlled devices in the home network via a signal splitter or other suitable configuration. For example, the conditional access information is transmitted from the shared conditional access network to the first conditional access controlled device 120.

The method 200 includes a step 220 in which the first conditional access controlled device 120 determines that it cannot read or understand the conditional access information it receives because the conditional access information is being transmitted according to a transmission protocol with which the first conditional access controlled device 120 is not compatible. As discussed hereinabove, the first conditional access controlled device 120 is a network device that, for example, is not compatible with the particular conditional access transmission protocol being used to transmission the conditional access information. However, the first conditional access controlled device 120 is compatible with other transmission protocols, e.g., the particular home network transmission protocol.

The method 200 also includes a step 230 in which the first conditional access controlled device 120 queries other conditional access controlled devices in the home network (via the home network connection 130) whether the other conditional access controlled devices can receive conditional access information and, if so, how these other conditional access controlled devices are capable of receiving the conditional access information. Typically, the step 230 includes an initial inquiry of conditional access controlled devices that may be capable of receiving conditional access information that the first conditional access controlled device 120 cannot read. Upon one or more of these network devices (e.g., the second conditional access controlled device 110) responding to the first conditional access controlled device 120 that they are capable of receiving conditional access information, the first conditional access controlled device 120 queries the second conditional access controlled device 110 how the conditional access information is being received, e.g., what conditional access transmission protocol is being used to transmit the conditional access information, and if the second conditional access controlled device 110 is compatible with such conditional access transmission protocol.

The method 200 also includes a step 240 in which the second conditional access controlled device 110 responds to the query by the first conditional access controlled device 120. The second conditional access controlled device 110 responds by indicating that it is capable of receiving conditional access information according to the particular transmission protocol being used, and that the second conditional access controlled device 110 is compatible with such conditional access transmission protocol.

The method 200 also includes a step 250 in which the first conditional access controlled device 120 requests that the second conditional access controlled device 110 receive conditional access information on behalf of the first conditional access controlled device 120 and to transmit or deliver the received conditional access information to the first conditional access controlled device 120. That is, the first conditional access controlled device 120 requests that the second conditional access controlled device 110 receive conditional access information intended for the first conditional access controlled device 120.

If multiple conditional access controlled devices respond to the initial query by the first conditional access controlled device 120 (i.e., step 230), then the first conditional access controlled device 120 can select any one or more of the responding conditional access controlled devices, e.g., either automatically or manually. For example, the first conditional access controlled device 120 can select the first responding conditional access controlled device.

The method 200 includes a step 260 in which, in response to the request in the step 250 by the first conditional access controlled device 120, the second conditional access controlled device 110 receives the conditional access information on behalf of the first conditional access controlled device 120. The second conditional access controlled device 110 receives the conditional access information according to the conditional access transmission protocol via the conditional access network connection 118.

The step 260 also includes the second conditional access controlled device 110 preparing the received conditional access information for delivery to the first conditional access controlled device 120. The second conditional access controlled device 110 reconfigures or reformats the received conditional access information from the conditional access transmission protocol to a home network transmission protocol with which the first conditional access controlled device 120 is compatible.

The method 200 also includes a step 270 in which the second conditional access controlled device 110 transmits or delivers the reformatted conditional access information to the first conditional access controlled device 120. Once the second conditional access controlled device 110 reformats the conditional access information, the second conditional access controlled device 110 transmits the reformatted conditional access information to the first conditional access controlled device 120, via the home network connection 130, according to the home network transmission protocol.

For example, the first conditional access controlled device 120 issues a message to establish a connection to the second conditional access controlled device 110. The message includes the information necessary for the second conditional access controlled device 110 to establish an appropriate home network connection according to any suitable home network protocol with which both the first conditional access controlled device 120 and the second conditional access controlled device 110 are compatible. Such information can include necessary device address and port locations, and other suitable information necessary for establishing a proper home network connection.

Alternatively, if the first conditional access controlled device 120 has conditional access information that needs to be transmitted to the shared conditional access network, the first conditional access controlled device 120 can request that the established connection between the first conditional access controlled device 120 and the second conditional access controlled device 110 be configured for two-way communications. In this manner, a return path from the first conditional access controlled device 120 to the second conditional access controlled device 110 is defined in addition to the initially-defined path from the second conditional access controlled device 110 to the first conditional access controlled device 120. Therefore, with a two-way connection established, the first conditional access controlled device 120 can both receive conditional access information from and transmit conditional access information to the shared conditional access network via the second conditional access controlled device 110, the conditional access connection 118 and the signal splitter 140.

Figure 3:
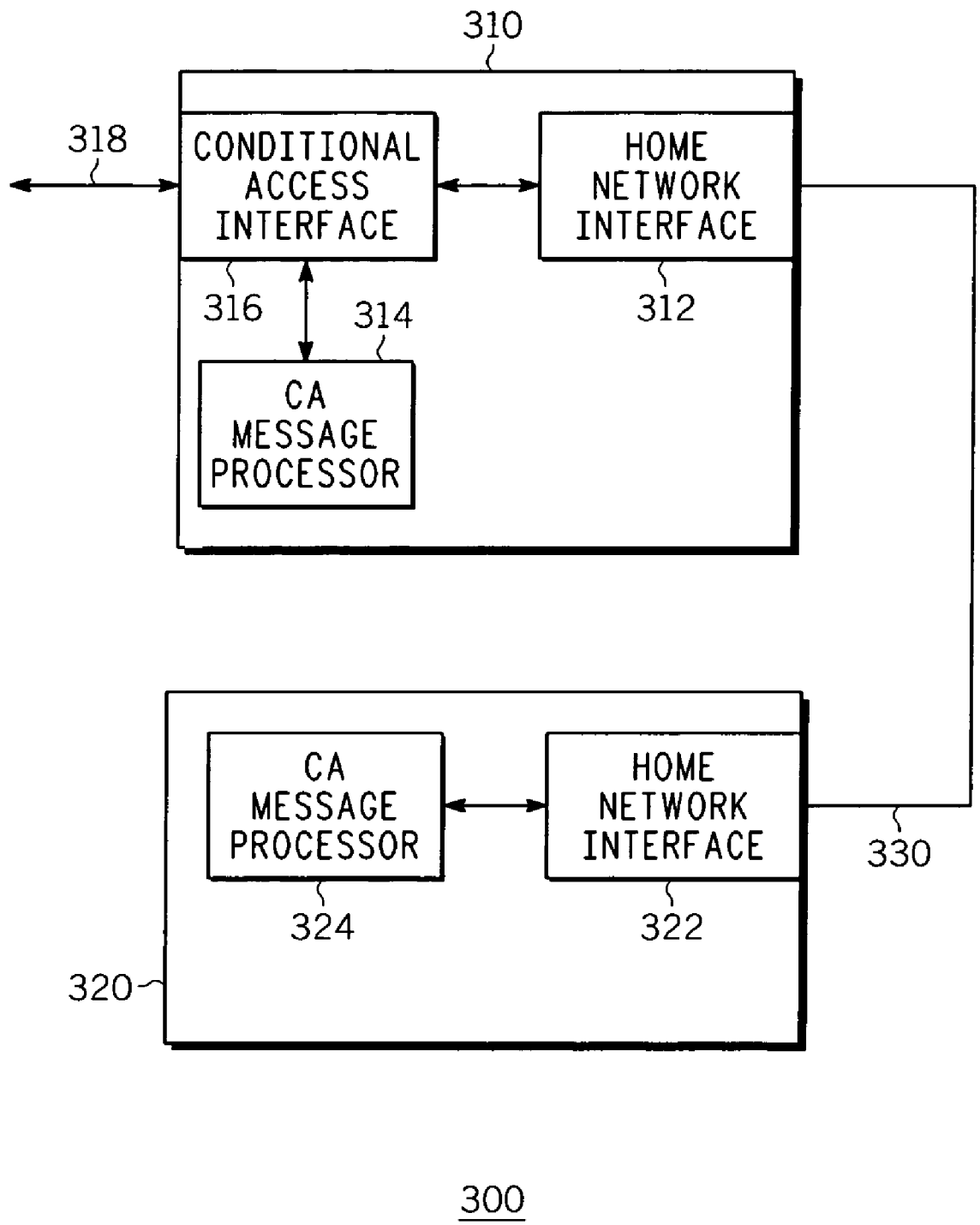
FIG. 3 is a block diagram of a home or business network that includes an alternative system for routing conditional access information intended for one conditional access controlled device through another conditional access controlled device.

Referring now to FIG. 3, shown is a block diagram of an alternative home or business network system 300 for routing conditional access information intended for one conditional access controlled device through another conditional access controlled device. The system 300 is any suitable home or business network, e.g., a home or business network connected to a shared conditional access network. The system 300 includes at least two conditional access controlled devices, e.g., a first conditional access controlled device 320 and a second conditional access controlled device 310 coupled together via a home network connection 330.

The first conditional access controlled device 320 includes a home network interface 322 for connecting the first conditional access controlled device 320 to the home network via the home network connection 330. The first conditional access controlled device 320 also includes a conditional access (CA) message processor 324 for reading CA messages transmitted to the first conditional access controlled device 320. In the system 300, the first conditional access controlled device 320 is configured in such a way that is it not supported by or compatible with the particular conditional access transmission protocol(s) being used to transmit conditional access information in the system 300.

The second conditional access controlled device 310 includes a home network interface 312 for connecting the second conditional access controlled device 310 to the home network via the home network connection 330. The second conditional access controlled device 310 also includes a conditional access interface 316 for connecting the second conditional access controlled device 310 to the shared conditional access network, via a conditional access connection 318. The second conditional access controlled device 110 also includes a conditional access (CA) message processor 314 for reading CA messages transmitted to the second conditional access controlled device 310. Although the CA message processor 314 is shown connected to the conditional access interface 116, the CA message processor 314 also can be connected to the home network interface 312, or both interfaces. In the system 300, the second conditional access controlled device 310 is configured to be supported by and compatible with at least one conditional access transmission protocol being used to transmit conditional access information in the system 300.

The home network system 300 in FIG. 3 is similar to the system 100 shown in FIG. 1, however, in the system 300, the first conditional access controlled device 320 does not have a direct physical connection to the conditional access connection like the conditional access connection 128 shown in FIG. 11. Therefore, in the system 300, all shared conditional access network traffic intended for the first conditional access controlled device 320 will be routed through the second conditional access controlled device 310, including conditional access information transmitted according to transmission protocols both compatible with and not compatible with the first conditional access controlled device 320.

For conditional access information transmitted according to transmission protocols with which the first conditional access controlled device 320 is not compatible, the second conditional access controlled device 310 will reformat the conditional access information according to a local transmission protocol with which both the first conditional access controlled device 320 and the second conditional access controlled device 310 are compatible. This is similar to the situation discussed hereinabove with respect to the operation of the system 100 shown in FIG. 1. For conditional access information transmitted according to transmission protocols with which the first conditional access controlled device 320 is compatible, the second conditional access controlled device 310 will deliver the conditional access information intended for the first conditional access controlled device 320 without reformatting the conditional access information.

The method shown in FIG. 2 may be implemented in a general, multi-purpose or single purpose processor. Such a processor will execute instructions, either at the assembly, compiled or machine-level, to perform that process. Those instructions can be written by one of ordinary skill in the art following the description of FIG. 2 and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), packetized or non-packetized wireline or wireless transmission signals.

It will be apparent to those skilled in the art that many changes and substitutions can be made to the signal routing system and method herein described without departing from the spirit and scope of the invention as defined by the appended claims and their full scope of equivalents.

The invention claimed is:

1. A computer program stored on a tangible computer-readable storage medium for delivering conditional access information according to a first transmission protocol selected from the group consisting of Data Over Cable Service Interface Specification (DOCSIS) and DOCSIS Set-top Gateway (DSG) to at least one first conditional access controlled device that is not compatible with the first transmission protocol, wherein the first conditional access controlled device comprises a first set-top box and is coupled to at least one second conditional access controlled device that comprises a second set-top box and is compatible with the first transmission protocol, wherein the first conditional access controlled device and the second conditional access controlled device are both in a home network and are coupled via a home network connection of the home network, the program comprising:
   instructions for requesting that the second conditional access controlled device receive the conditional access information intended for the first conditional access controlled device according to the first transmission protocol and deliver the conditional access information to the first conditional access controlled device according to a second transmission protocol via the home network connection;
   instructions for receiving the conditional access information by the second conditional access controlled device according to the first transmission protocol; and
   instructions for delivering the conditional access information from the second conditional access controlled device to the first conditional access controlled device according to the second transmission protocol and via the home network connection.

2. The computer program as recited in claim 1, wherein the second transmission protocol is selected from the group consisting of Multimedia over Coax Alliance (MoCA) and Society of Cable Telecommunications Engineers (SCTE) SCTE-55.

3. The computer program as recited in claim 1, wherein the second conditional access controlled device reformats the conditional access information transmitted thereto from the first transmission protocol to the second transmission protocol prior to delivering the conditional access information to the first conditional access controlled device.

4. The computer program as recited in claim 1, wherein the first transmission protocol further comprises a conditional access transmission protocol and wherein the second transmission protocol further comprises a home network transmission protocol.

5. The computer program as recited in claim 1, wherein the conditional access information includes conditional access (CA) messages.

6. The computer program as recited in claim 1, further comprising instructions for determining by the first conditional access controlled device that the conditional access information can be received by the second conditional access controlled device according to the first transmission protocol.

7. The computer program as recited in claim 1, wherein the first conditional access controlled device, prior to requesting the conditional access information from the second conditional access controlled device, queries the second conditional access controlled device if the second conditional access controlled device has received the conditional access information.

8. A network system, the network system receiving conditional access information from a source according to a first transmission protocol selected from the group consisting of Data Over Cable Service Interface Specification (DOCSIS) and DOCSIS set-top gateway (DSG), the network system comprising:
   at least one first conditional access controlled device comprising a first set-top box, wherein the first conditional access controlled device is not configured to receive conditional access information according to the first transmission protocol; and
   at least one second conditional access controlled device comprising a second set-top box including a shared conditional access network connection for receiving conditional access information intended for the first conditional access controlled device according to the first transmission protocol,
   wherein the first and second conditional access controlled devices are both in a home network and are coupled together via a home network connection of the home network,
   wherein the second conditional access controlled device receives conditional access information from the source according to the first transmission protocol and via the shared conditional access network connection, and
   wherein the first conditional access controlled device receives conditional access information from the second conditional access controlled device according to a second transmission protocol and via the home network connection, wherein both the first and second conditional access controlled devices are configured to receive conditional access information according to the second transmission protocol.

9. The system as recited in claim 8, wherein the second transmission protocol is selected from the group consisting of Multimedia over Coax Alliance (MoCA) and Society of Cable Telecommunications Engineers (SCTE) SCTE-55.

10. The system as recited in claim 8, wherein the second conditional access controlled device includes a conditional access network interface configured to receive conditional access information according to the first transmission protocol.

11. The system as recited in claim 8, wherein the first conditional access controlled device includes a home network interface configured to transmit and receive conditional access information according to the second transmission protocol.

12. The system as recited in claim 8, wherein the second conditional access controlled device includes a home network interface configured to transmit and receive conditional access information according to the second transmission protocol.

13. The system as recited in claim 8, wherein the first conditional access controlled device is coupled to the source via a shared conditional access network connection.

14. The system as recited in claim 8, wherein the conditional access information includes conditional access (CA) messages, and wherein at least one of the first and second conditional access controlled devices includes a CA message processor.

* * * * *